United States Patent
Ohshima et al.

(10) Patent No.: US 9,929,628 B2
(45) Date of Patent: Mar. 27, 2018

(54) MAGNET INSERTION METHOD INTO ROTOR CORE

(71) Applicant: NISSAN MOTOR CO., LTD., Yokohama-shi, Kanagawa (JP)

(72) Inventors: Takumi Ohshima, Yokohama (JP); Kiyoshi Hasegawa, Yokohama (JP); Takashi Sekikawa, Yokohama (JP); Yasushi Matsushita, Yokohama (JP); Akihisa Hori, Yokohama (JP); Michito Kishi, Atsugi (JP); Hiroaki Shibukawa, Machida (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 189 days.

(21) Appl. No.: 14/787,985

(22) PCT Filed: Mar. 27, 2014

(86) PCT No.: PCT/JP2014/058978
§ 371 (c)(1),
(2) Date: Oct. 29, 2015

(87) PCT Pub. No.: WO2014/178246
PCT Pub. Date: Nov. 6, 2014

(65) Prior Publication Data
US 2016/0111944 A1    Apr. 21, 2016

(30) Foreign Application Priority Data

May 1, 2013    (JP) .................................. 2013-096555

(51) Int. Cl.
*H02K 15/03* (2006.01)

(52) U.S. Cl.
CPC .................................... *H02K 15/03* (2013.01)

(58) Field of Classification Search
CPC .......... H02K 1/27; H02K 1/276; H02K 1/278; H02K 1/28; H02K 15/03
See application file for complete search history.

(56) References Cited

U.S. PATENT DOCUMENTS

| 4,910,861 A | * | 3/1990 | Dohogne | ............... H02K 1/278 264/272.2 |
| 2004/0046469 A1 | | 3/2004 | Oshima et al. | |
| 2012/0274165 A1 | | 11/2012 | Fukaya et al. | |

FOREIGN PATENT DOCUMENTS

| JP | 10042499 A | * | 2/1998 |
| JP | 10174326 A | * | 6/1998 |

(Continued)

*Primary Examiner* — Carl Arbes
(74) *Attorney, Agent, or Firm* — Young Basile Hanlon & MacFarlane, P.C.

(57) ABSTRACT

A magnet insertion method into a rotor core is to insert an assembly into a magnet insertion hole provided in the rotor core of an electric motor, the assembly being formed by laminating a plurality of members, including at least a plurality of magnet pieces, in a line. According to this magnet insertion method, the assembly is formed by arranging a front member, having a surface surrounded by a chamfered ridge line, to cause the surface to be a front side end surface upon insertion, by laminating, on its rear side in an insertion direction, other members, without having the chamfered ridge line, in a line along the insertion direction to cause the other members to be hidden inside a projection of the front member when being projected from an insertion hole side, and by temporarily holding the front member and the other members.

6 Claims, 6 Drawing Sheets

(56) References Cited

FOREIGN PATENT DOCUMENTS

| | | | | |
|---|---|---|---|---|
| JP | 10290542 | A | * | 10/1998 |
| JP | 3351237 | B2 | * | 11/2002 |
| JP | 2011-182486 | A | | 9/2011 |
| JP | 2012-039746 | A | | 2/2012 |
| WO | 2001-095460 | A1 | | 12/2001 |
| WO | 2012-111065 | A1 | | 8/2012 |

* cited by examiner

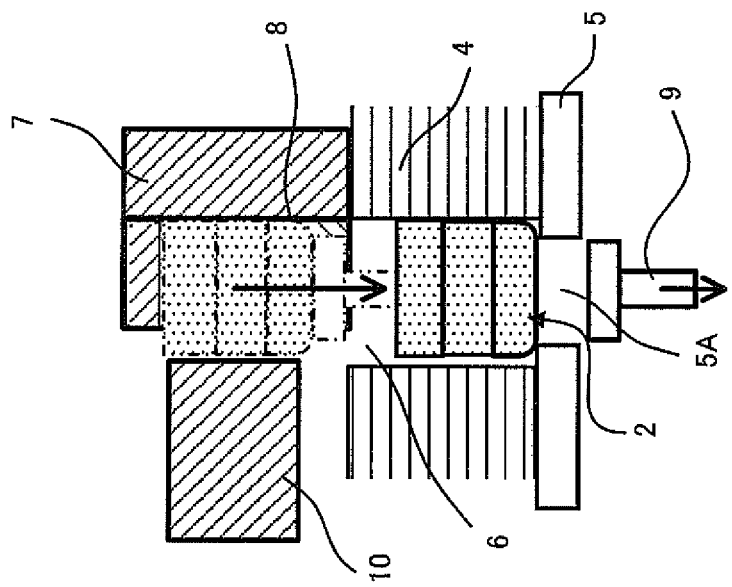
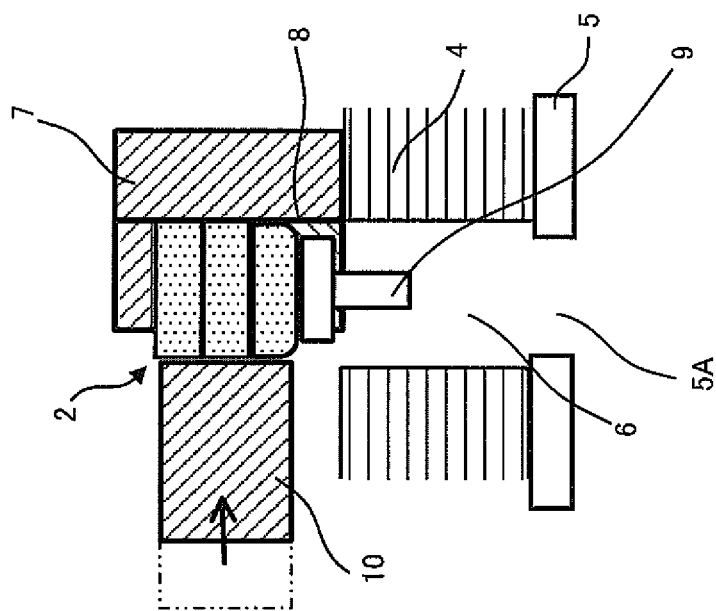

MAGNET INSERTION METHOD INTO ROTOR CORE

CROSS REFERENCE TO RELATED APPLICATION

The present application is based on Japanese Patent Application No. 2013-096555 filed on May 1, 2013, the entire content of which is herein incorporated by reference.

TECHNICAL FIELD

The present invention relates to a technique of inserting a magnet into a rotor core of an electric motor.

BACKGROUND

Permanent magnet type synchronous motors, in which permanent magnets are embedded in rotors (hereinafter referred to as "PM motors"), are well known as electric motors used in electric vehicles and the like. Further, methods of reducing eddy current loss by dividing the magnets to be embedded are well known as methods of improving efficiency of the PM motors. According to WO2001/095460, for example, magnet pieces that are divided into a plurality of pieces are adhered to each other to form one long plate-shaped magnet, and this long plate-shaped magnet is inserted into a magnet insertion hole in a rotor core.

According to the above-described literature, the magnet pieces are adhered to each other by aligning the magnet pieces in an outer frame that is formed by organic resin, and applying pressure and heat and the like from the outside, so as to form the long plate-shaped magnet. This results in high manufacturing costs required for forming the long plate-shaped magnet.

However, when the magnet pieces are separately inserted into the magnet insertion hole in the rotor core in order to reduce the costs required for forming the long plate-shaped magnet, the magnet pieces get easily stuck in the middle of the magnet insertion hole and do not reach the bottom of the insertion hole, in the case where corners of the magnet pieces are not subjected to chamfering. On the other hand, when the corners of all the magnet pieces to be inserted are subjected to the chamfering, cost of the chamfering increases greatly, and performance of the magnet deteriorates due to a reduction in magnet volume by the chamfering.

SUMMARY

The present invention is made in view of the above-described problems, and an object of the present invention is to provide a method of inserting magnet pieces into a magnet insertion hole, while suppressing increase in costs and deterioration of performance.

According to one embodiment of this invention, a magnet insertion method into a rotor core for inserting an assembly into a magnet insertion hole provided in the rotor core of an electric motor, the assembly being formed by laminating a plurality of members, including at least a plurality of magnet pieces, in a line, the magnet insertion method comprising; forming the assembly by arranging a front member, having a surface surrounded by a chamfered ridge line, to cause the surface to be a front side end surface upon insertion, by laminating, on a rear side of the front member in an insertion direction, other members, without having the chamfered ridge line, in a line along the insertion direction to cause the other members to be hidden inside a projection of the front member when being projected from an insertion hole side, and by temporarily holding the front member and the other members.

BRIEF DESCRIPTION OF THE DRAWINGS

FIG. 6 is a third view explaining the operation of the magnet insertion device;

FIG. 7 is a fourth view explaining the operation of the magnet insertion device;

DETAILED DESCRIPTION OF THE EMBODIMENTS

Hereinafter, embodiments of the present invention will be explained with reference to the attached drawings.

First Embodiment

Figure 1:
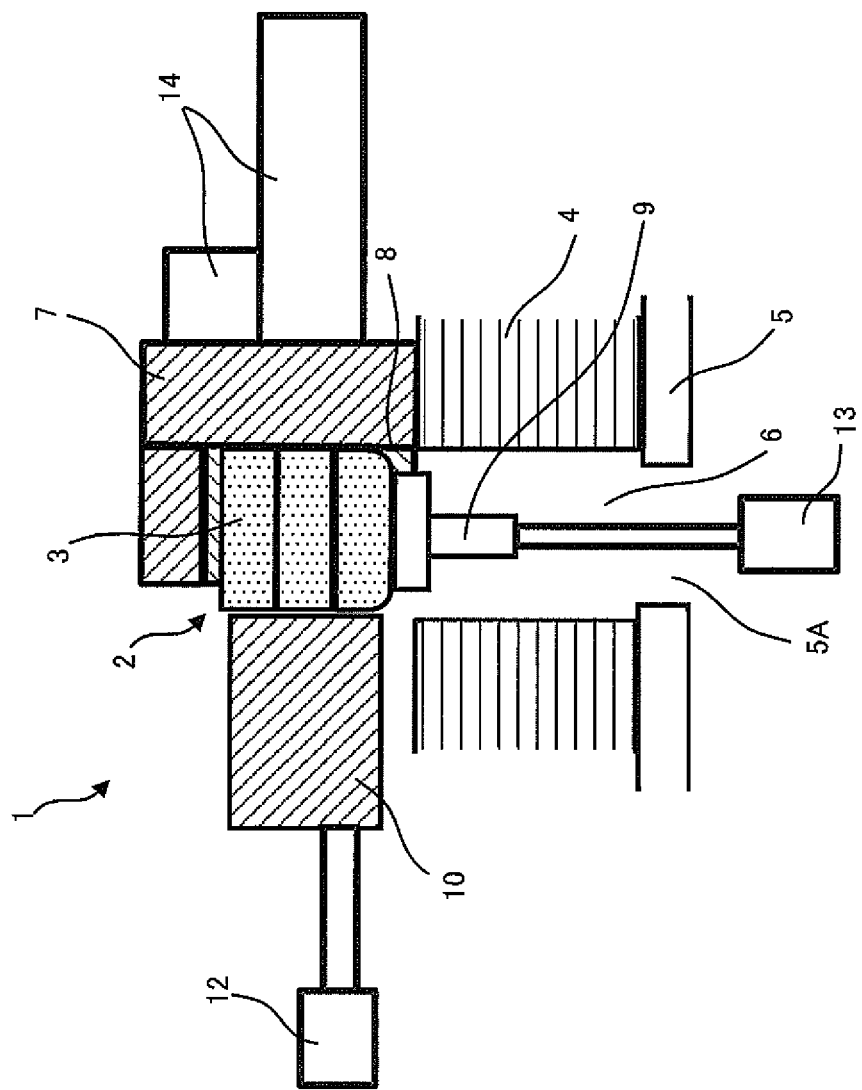
FIG. 1 is a schematic block diagram of a magnet insertion device, to which a first embodiment is applied.

FIG. 1 is a schematic block diagram of a magnet insertion device 1 that is used in a first embodiment. The magnet insertion device 1 is a device for inserting an assembly 2 that is formed by laminating a plurality of magnet pieces 3 as a tip member or another member into a magnet insertion hole 6 in a rotor core 4 that is formed by laminated steel sheets. The assembly 2 will be described in detail later.

The magnet insertion device 1 is provided with a rotor core support disk 5 that holds the rotor core 4, a magnet receiver 9 that holds the assembly 2 and serves as an assembly receiving member, an alignment jig 7 that holds side surfaces of the assembly 2, and a magnet alignment rod 10 that presses the assembly 2 against the alignment jig 7.

The magnet receiver 9, driven by a magnet receiver drive unit 13, moves along an axis of the magnet insertion hole 6 from the lower side to the upper side of the magnet insertion hole 6. In order to prevent the magnet pieces 3, aligned by a method that will be described later, from being misaligned during driving, the magnet receiver drive unit 13 is supposed to be a unit that does not produce vibration, such as an air cylinder.

The magnet alignment rod 10, driven by an alignment rod drive unit 12, moves in the direction perpendicular to the axis of the magnet insertion hole 6. The alignment jig 7, driven by an alignment jig linear motion unit 14, moves in the direction perpendicular to the axis of the magnet insertion hole 6.

The alignment jig 7 has a surface that faces against the side surface on the right side of the assembly 2 in the drawing, and a surface that faces against the side surface on the back side of the assembly 2 in the drawing. In addition to the magnet alignment rod 10 and the alignment rod drive unit 12 as illustrated in FIG. 1, ones that move from the front side to the back side in the drawing are also provided.

The rotor core support disk 5 has an opening 5A at a position corresponding to the magnet insertion hole 6 in the rotor core 4, the opening 5A being smaller than the cross section of the assembly 2 crossing the axis of the magnet insertion hole 6, as will be described later.

Now, an explanation will be given to the assembly 2.

Figure 2:
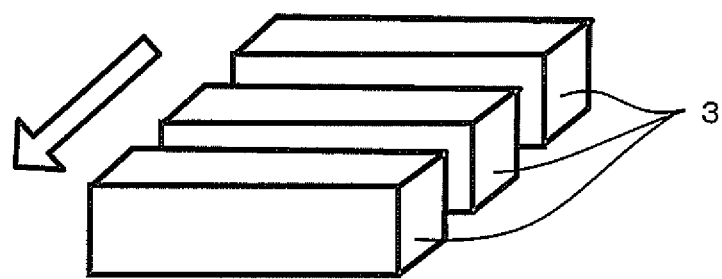
FIG. 2 is a view illustrating a plurality of magnet pieces to be inserted.
Figure 3:
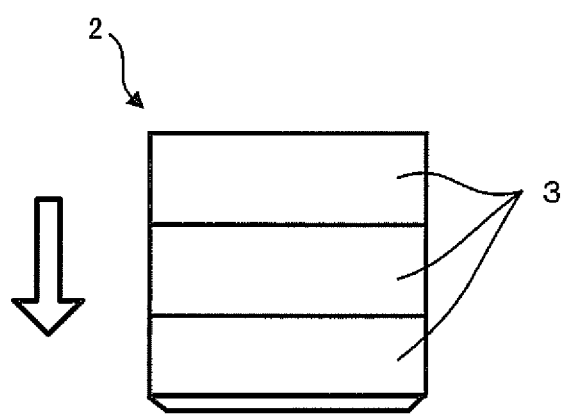
FIG. 3 is a schematic view of an assembly according to the first embodiment.

FIG. 2 and FIG. 3 are views for explaining the assembly 2. Arrows in the drawings indicate the direction of movement when the assembly 2 is inserted into the magnet insertion hole 6 (hereinafter referred to as the insertion direction).

The assembly 2 is formed by laminating the magnet pieces 3, divided into a plurality of pieces, in a line along the insertion direction. The magnet piece 3, to be the front piece upon insertion, has its surface surrounded by a chamfered ridge line, and is arranged in such a manner that the surface surrounded by the chamfered ridge line becomes the front side end surface upon insertion. The second and the third magnet pieces 3 from the insertion direction do not have the chamfered ridge line. The second and the third magnet pieces 3 from the insertion direction are arranged in such a manner that, when the assembly 2 is projected from the insertion direction, the second and the third magnet pieces 3 are hidden inside the projection of the front magnet piece 3. Incidentally, in this case, it is supposed that the projections of all the magnet pieces 3 included in the assembly 2 have the same shape when being projected from the side of the magnet insertion hole 6.

Next, operation of the magnet insertion device 1 will be explained with reference to FIG. 4 to FIG. 7. Incidentally, in FIG. 4 to FIG. 7, the alignment rod drive units 12, the magnet receiver drive unit 13 and the alignment jig linear motion unit 14 are omitted.

Figure 4:
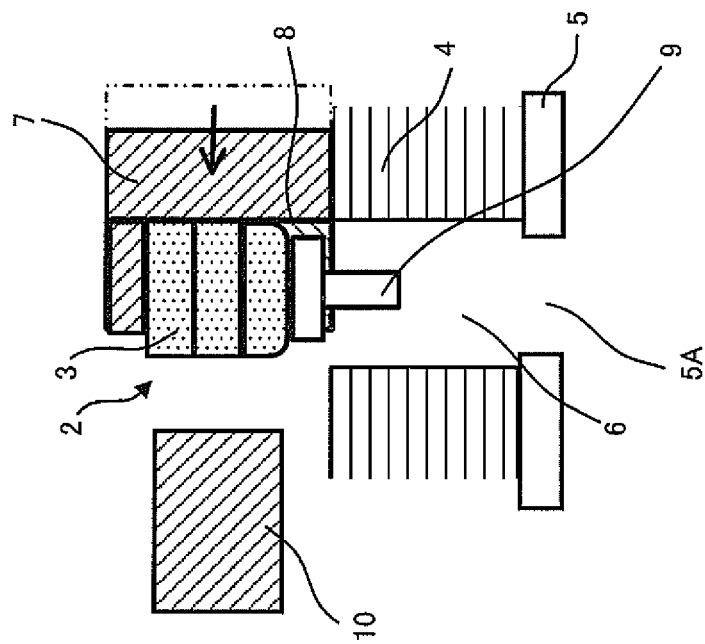
FIG. 4 is a first view explaining operation of the magnet insertion device.

Initially, as illustrated in FIG. 4, the magnet receiver 9 is located at a position lower than the rotor core support disk 5, and the magnet alignment rods 10 and the alignment jig 7 are located outward in a radial direction of the magnet insertion hole 6.

In this state, the rotor core 4 is arranged on the rotor core support disk 5, and the magnet receiver 9 is ascended to a position higher than the upper end surface of the rotor core 4.

Figure 5:
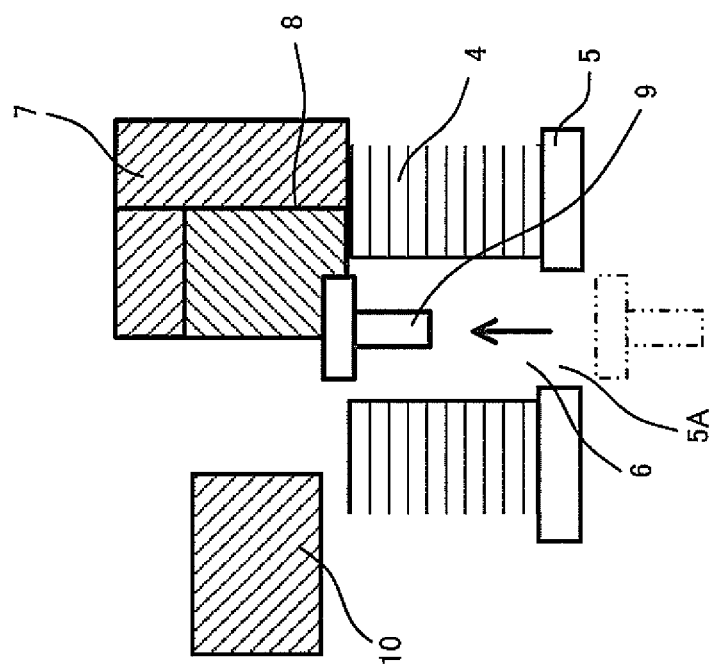
FIG. 5 is a second view explaining the operation of the magnet insertion device.

When the magnet receiver 9 is ascended as illustrated in FIG. 5, the magnet pieces 3 are laminated on the ascended magnet receiver 9 in the same order as that of FIG. 3. The magnet pieces 3 are supplied in order by a not-illustrated supply device, such as a robot arm, for example. When interference between the supply device and the alignment jig 7 occurs at this time, the alignment jig 7 is moved further outward in the radial direction of the magnet insertion hole 6.

When the magnet pieces 3 are laminated, the alignment jig 7 is moved so that the surfaces of the alignment jig 7 abutting against the magnet pieces 3 (hereinafter referred to as magnet piece reference surfaces 8), in the right/left direction and the front/back direction in the drawing, are lined up with the wall of the magnet insertion hole 6. Incidentally, the magnet piece reference surfaces 8 may be closer to the center of the magnet insertion hole 6 by about 0.01 mm than the wall of the magnet insertion hole 6.

In addition, the alignment jig 7 and the magnet alignment rods 10 may have such shape and arrangement that are able to prevent the magnet piece 3 from dropping from the magnet receiver 9 or from the lower magnet piece 3, so as to avoid a fall of the laminated magnet pieces 3.

When the lamination of the magnet pieces 3 is finished, the magnet alignment rods 10 are pressed against the magnet pieces 3, as illustrated in FIG. 6, so as to align the laminated magnet pieces 3 along the magnet piece reference surfaces 8. Thereby, the second and the third magnet pieces 3 from the bottom are hidden inside the front magnet piece 3, when being projected from the side of the magnet insertion hole 6. When interference between the magnet alignment rods 10 occurs, one of the magnet alignment rods 10 is retracted.

Incidentally, it is also suitable to cause the magnet piece reference surfaces 8 to line up with the wall of the magnet insertion hole 6 and to move the magnet alignment rods 10, before laminating the magnet pieces 3, so that the alignment is finished when the lamination is finished.

When the alignment of the magnet pieces 3 is finished, that is, when the assembly 2 is formed, as illustrated in FIG. 7, the magnet receiver 9 is descended to a position lower than the lower end of the rotor core 4. The assembly 2 remains inside the magnet insertion hole 6 as it is get stuck over the opening 5A of the rotor core support disk 5, and the insertion of the magnet pieces 3 into the magnet insertion hole 6 is thus finished.

With regard to the assembly 2, the tip surface is chamfered and the plurality of magnet pieces 3 are aligned in such a manner that the second and the third magnet pieces 3 are hidden inside the front magnet piece 3, when being projected from the side of the magnet insertion hole 6, as described above. Supposing that the assembly 2 comes in contact with the wall of the magnet insertion hole 6, at the time of descending the magnet receiver 9, the surface that comes in contact with the wall is the chamfered front side end surface. Thus, the assembly 2 reaches the lower end of the magnet insertion hole 6, without being stuck in the middle. As it is not necessary to chamfer the second and the third magnet pieces 3 from the bottom, the costs required for the chamfering can be reduced.

Figure 8:
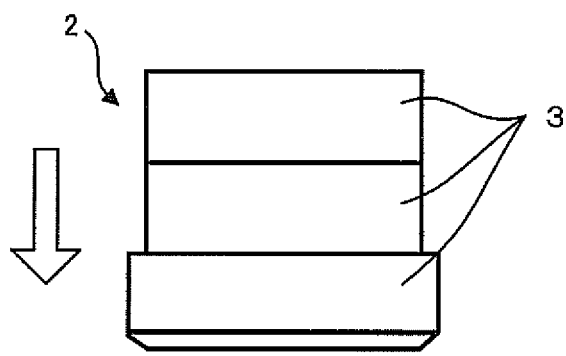
FIG. 8 is a view illustrating another example of an assembly.
Figure 10:
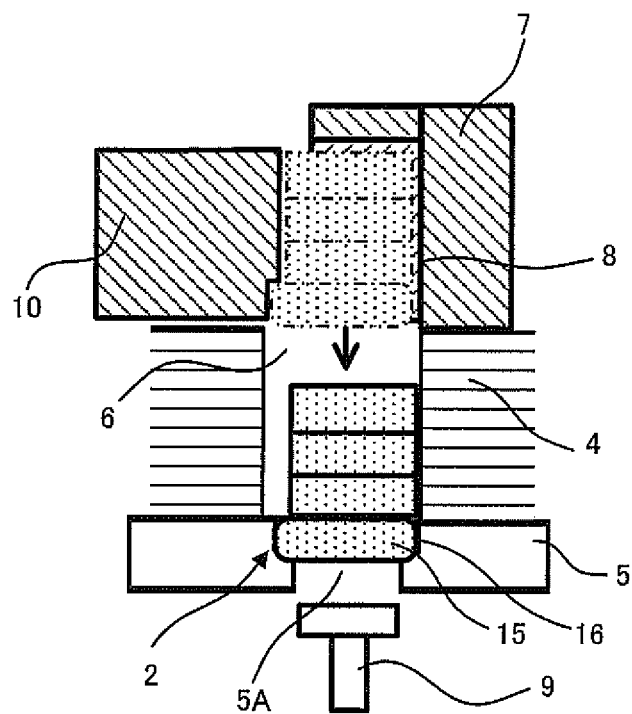
FIG. 10 is a schematic block diagram of the magnet insertion device, to which the second embodiment is applied.

FIG. 8 is a view illustrating another example of the assembly 2, to which this embodiment can be applied. The difference from the assembly 2 of FIG. 3 is that, when being projected from the side of the magnet insertion hole 6, the projection of the front magnet piece 3 is larger than the projections of the second and the third magnet pieces 3 from the bottom, and that a difference in level is formed between the front magnet piece 3 and the magnet piece 3 second from the bottom. It is also possible to insert the assembly 2 like this into the magnet insertion hole 6 by the above-described process. Incidentally, when using the assembly 2 of FIG. 8, it is preferable that each of the magnet alignment rods 10 and the alignment jig 7, at the position abutting against the magnet pieces 3, be formed to have a shape corresponding to the difference in level formed between the front magnet piece 3 and the magnet piece 3 second from the bottom. For example, as illustrated in FIG. 10 that will be described later, it is preferable to form the alignment jig 7 to have flat surfaces, and each of the magnet alignment rods 10 to have such a shape that corresponds to the difference in level formed on the side surface of the magnet alignment rod 10 of the assembly 2 when the plurality of magnet pieces 3 are abutted against the alignment jig 7.

Next, effects of the above-described magnet insertion method will be explained.

The front magnet piece 3, having the surface surrounded by the chamfered ridge line, is arranged to be the front side end surface upon insertion and, on the back side thereof along the insertion direction, other magnet pieces 3, without having the chamfered ridge line, are laminated. Further, the plurality of magnet pieces 3 are aligned in a line along the insertion direction so that, when being projected from the side of the insertion hole, the other magnet pieces 3 are hidden inside the projection of the front magnet piece 3. Then, the plurality of magnet pieces 3 are held temporarily, while being aligned as described above, and thus the assembly 2 is formed.

It should be noted that the term "held temporarily" means the state where the plurality of magnet pieces 3 are laminated on the magnet receiver 9, without being adhered to each other by an adhesive, nor being formed integrally by resin molding or the like.

With the assembly 2 like this, edge portions of the magnet pieces 3 that are not chamfered are not exposed when viewed from the side of the magnet insertion hole 6, and the chamfered portion, provided on the front magnet piece 3, serves as a guide. Thus, the assembly 2 is inserted to the lower end of the magnet insertion hole 6, without being stuck in the middle against the inner wall of the magnet insertion hole 6. As the chamfering processing is applied to the front magnet piece 3 only, it is possible to suppress reduction in the volume of the magnet by the chamfering processing, and to avoid deterioration of performance of the magnet. In addition, it is possible to reduce the costs required for the chamfering processing.

Similar effects to those described above can also be obtained when the projected area of the second and the third magnet pieces 3 from the bottom, being projected from the side of the insertion hole, is smaller than the projected area of the front magnet piece 3, being projected from the side of the insertion hole.

The rotor core 4 is arranged in such a manner that the axis of the magnet insertion hole 6 extends in the vertical direction, and the alignment jig 7 that holds at least two side surfaces of the assembly 2, the side surfaces being perpendicular to each other, and the magnet receiver 9 that holds the front side end surface of the assembly 2 upon insertion are arranged at a position higher than the magnet insertion hole 6. The plurality of magnet pieces 3 are laminated on the magnet receiver 9 and aligned by being pressed by the magnet alignment rods 10 from directions opposing the alignment jig 7, so as to form the assembly 2. Thus, the alignment of the magnet pieces 3 can be made accurately.

Further, the assembly 2 is not stuck against the wall of the magnet insertion hole 6, as described above. Therefore, even though the magnet pieces 3 are held temporarily, without being adhered to each other, the assembly 2 is integrally descended by the action of gravity when the magnet receiver 9 is descended, and reaches the lower end of the magnet insertion hole 6.

Second Embodiment

This embodiment is different from the first embodiment in the structure of the assembly 2 and accordingly, a part of the structure of the magnet insertion device 1. Hereinafter, differences from the first embodiment will mainly be explained.

Figure 9:
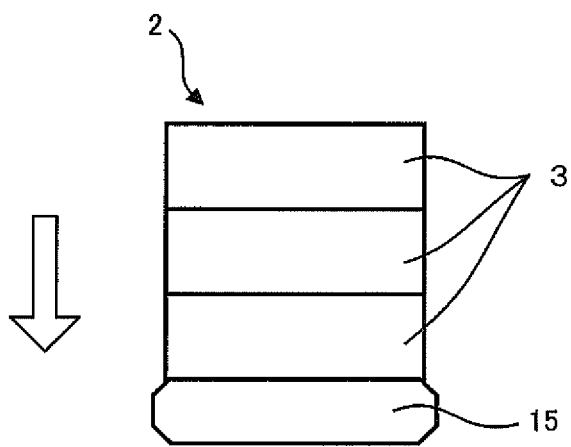
FIG. 9 is a schematic view of the assembly according to a second embodiment.

FIG. 9 is a schematic block diagram of the assembly 2 according to this embodiment. FIG. 10 is a view illustrating the state where the magnet receiver 9 is descended after the assembly 2 is formed.

The assembly 2 according to this embodiment is formed by three magnet pieces 3, each of which do not have a chamfered ridge line, and a dummy workpiece 15 as a front member, whose ridge lines are respectively chamfered.

On the side surface of the magnet alignment rod 10 on the side of the assembly 2, there is provided a difference in level, corresponding to a difference in level formed between the side surface of the dummy workpiece 15 on the sides of the magnet alignment rods 10 and the side surfaces of the magnet pieces 3 on the sides of the magnet alignment rods 10, when the dummy workpiece 15 and the magnet pieces 3 are abutted against the magnet piece reference surfaces 8.

A housing unit 16 for housing the dummy workpiece 15 is provided in the rotor core support disk 5. The depth of the housing unit 16 is equal to the thickness of the dummy workpiece 15 in the insertion direction.

First, the dummy workpiece 15 is arranged on the magnet receiver 9, and three magnet pieces 3 are laminated thereon, thus forming the state of FIG. 9. Then, the magnet alignment rods 10 are abutted. As the above-described difference in level is formed in the side surfaces of the magnet alignment rods 10 on the side of the assembly 2, both of the dummy workpiece 15 and the magnet pieces 3 are pressed against the magnet piece reference surfaces 8, and the alignment is made in such a manner that, when being projected from the side of the insertion hole 6, the three magnet pieces 3 are hidden inside the projection of the dummy workpiece 15.

When the dummy workpiece 15 and the magnet pieces 3 are aligned, the magnet receiver 9 is descended to the position lower than the rotor core support disk 5. Thereby, the dummy workpiece 15 is housed in the housing unit 16, and the three magnet pieces 3 remain in the magnet insertion hole 6.

According to this embodiment, similarly to the first embodiment, the magnet pieces 3 are inserted to the lower end of the magnet insertion hole 6, without being stuck, as the dummy workpiece 15 has the chamfering portions.

Further, the assembly 2 is moved along the insertion direction until the dummy workpiece 15 passes through the magnet insertion hole 6, and therefore the dummy workpiece 15 does not remain inside the rotor core 4.

The embodiments of the present invention have been explained thus far. However, the above embodiments are only a part of application examples of the present invention, and are not intended to limit the technical scope of the present invention to the concrete structures of the above-described embodiments.

The invention claimed is:

1. A magnet insertion method into a rotor core for inserting an assembly into a magnet insertion hole provided in the rotor core of an electric motor, the assembly being formed by laminating a plurality of members, including at least a plurality of magnet pieces, in a line on an assembly receiving member, the magnet insertion method comprising:
    forming the assembly by arranging a front member, having a surface surrounded by a chamfered ridge line, to cause the surface to be a front side end surface upon insertion, by laminating, on a rear side of the front member in an insertion direction, other members that do not have the chamfered ridge line, in a line along the insertion direction on the assembly receiving member to cause the other members to be hidden inside a projection of the front member when being projected from an insertion hole side, and by temporarily holding the front member and the other members.

2. The magnet insertion method into the rotor core according to claim 1,
    wherein a projected area of the other members is smaller than a projected area of the front member, when being projected from the insertion hole side.

3. The magnet insertion method into the rotor core according to claim 1,
   wherein all of the plurality of members are magnets.

4. The magnet insertion method into the rotor core according to claim 1,
   wherein the front member is a dummy workpiece, and all the other members are magnets without having the chamfered ridge line.

5. The magnet insertion method into the rotor core according to claim 4,
   wherein the front member and the other members are moved in the insertion direction until the front member passes through the magnet insertion hole.

6. The magnet insertion method into the rotor core according to claim 1,
   wherein the rotor core is arranged to cause an axis of the magnet insertion hole to extend in a vertical direction,
   wherein an alignment jig for holding at least two side surfaces of the assembly, the side surfaces being perpendicular to each other, and an assembly receiving member for holding the front side end surface of the assembly upon insertion are arranged at a position higher than the magnet insertion hole, and
   wherein the plurality of members are laminated on the assembly receiving member and aligned by being pressed by a magnet alignment rod from a direction opposing the alignment jig, so as to form the assembly.

* * * * *